US009435282B2

(12) United States Patent
Kashiyama (10) Patent No.: US 9,435,282 B2
(45) Date of Patent: *Sep. 6, 2016

(54) FUEL SUPPLYING CONTROLLER (71) Applicant: DENSO CORPORATION, Kariya, Aichi-pref. (JP)

(72) Inventor: Hiromu Kashiyama, Okazaki (JP)

(73) Assignee: DENSO CORPORATION, Kariya (JP)

( * ) Notice: Subject to any disclaimer, the term of this patent is extended or adjusted under 35 U.S.C. 154(b) by 148 days.

This patent is subject to a terminal disclaimer.

(21) Appl. No.: 14/332,706

(22) Filed: Jul. 16, 2014

(65) Prior Publication Data

US 2015/0025776 A1 Jan. 22, 2015

(30) Foreign Application Priority Data

Jul. 18, 2013 (JP) ................................. 2013-149754

(51) Int. Cl.
*F02D 41/22* (2006.01)
*F02M 37/22* (2006.01)
*F02D 41/06* (2006.01)

(52) U.S. Cl.
CPC .............. *F02D 41/22* (2013.01); *F02M 37/22* (2013.01); *F02D 41/068* (2013.01); *F02D 2041/224* (2013.01); *F02D 2200/0602* (2013.01); *F02D 2200/0608* (2013.01); *F02D 2200/50* (2013.01); *Y02T 10/40* (2013.01)

(58) Field of Classification Search
CPC .. F02D 41/00; F02D 41/22; F02D 2041/224; F02M 25/00; F02M 25/07; F02M 37/00; F02M 37/007; F02M 37/22; F02M 59/44; G01M 15/00

USPC ........ 123/506, 509; 701/102, 103, 106, 114, 701/111, 115
See application file for complete search history.

(56) References Cited

U.S. PATENT DOCUMENTS

| 9,109,529 B2* | 8/2015 | Kashiyama | F02D 41/22 701/102 |
| 2009/0277424 A1 | 11/2009 | Yonemoto et al. | |
| 2011/0120104 A1* | 5/2011 | Masuda | B01D 53/994 60/311 |
| 2013/0311067 A1* | 11/2013 | Stockner | F02D 19/027 701/104 |

FOREIGN PATENT DOCUMENTS

| EP | 1 319 821 | 6/2003 |
| JP | 6-185394 | 7/1994 |

(Continued)

OTHER PUBLICATIONS

JP 2005-273535 English Translation Version.*

(Continued)

*Primary Examiner* — Hung Q Nguyen
*Assistant Examiner* — Johnny H Hoang
(74) *Attorney, Agent, or Firm* — Nixon & Vanderhye PC (57) ABSTRACT In a fuel supplying controller detecting a clogging of a fuel filter, a timer count portion includes a steady count portion and an unsteady count portion. The steady count portion adds a steady count value to a timer counter in a steady state where a vehicle-state value is less than a threshold. The unsteady count portion adds an unsteady count value that is greater than the steady count value to the timer counter in an unsteady state where the vehicle-state value is greater than or equal to the threshold.

5 Claims, 5 Drawing Sheets (56) References Cited

FOREIGN PATENT DOCUMENTS

| JP | 7-158497 | 6/1995 |
|---|---|---|
| JP | 2005-273535 | 10/2005 |
| JP | 2009-138649 | 6/2009 |
| JP | 2011-231659 | 11/2011 |

OTHER PUBLICATIONS

U.S. Appl. No. 14/332,715, filed Jul. 16, 2014.
Japanese Office Action (2 pages) dated Oct. 20, 2015, issued in corresponding Japanese Application No. 2013-149754 and English translation (3 pages).

* cited by examiner

FUEL SUPPLYING CONTROLLER

CROSS REFERENCE TO RELATED APPLICATION

This application is based on Japanese Patent Application No. 2013-149754 filed on Jul. 18, 2013, the disclosure of which is incorporated herein by reference.

TECHNICAL FIELD

The present disclosure relates to a fuel supplying controller provided with a fuel filter.

BACKGROUND

Conventionally, a fuel supplying device includes a fuel tank accommodating fuel, a supply pump drawing the fuel from the fuel tank and supplying the fuel to an internal combustion engine, and a fuel filter provided in a passage between the fuel tank and the supply pump to filter the fuel. The fuel filter prevents foreign matters from flowing to the supply pump and parts of the internal combustion, by removing the foreign matters in the fuel.

Since the fuel filter continuously removes the foreign matters in the fuel, the fuel filter may be clogged. When the fuel is supplied in a case where the fuel filter is clogged by the foreign matters, the foreign matters block a flow of the fuel. Therefore, it is necessary to detect a clogging of the fuel filter at an early stage and exchange the fuel filter, so as to ensure a reliability of the fuel supplying device.

Generally, a viscosity of the fuel varies in accordance with a fuel temperature. For example, when the fuel temperature is low, a high-viscosity change of the fuel is generated. The high-viscosity change of the fuel is a change of the viscosity of the fuel from a low viscosity to a high viscosity. When the fuel of the high viscosity is filtered by the fuel filter, the fuel is remarkably affected by a flow resistance of the fuel filter according to the high viscosity. Therefore, even when the clogging of the fuel filter is not generated by the foreign matters, the flow resistance may be detected as the clogging of the fuel filter. To avoid detecting the clogging according to the high-viscosity change of the fuel, it is known that a non-detection period where a clogging detection is prohibited is set until the high-viscosity change of the fuel is canceled by increasing the fuel temperature.

A method for determining that the high-viscosity change of the fuel is canceled by increasing the fuel temperature is necessary to set the non-detection period. To monitor an increase in fuel temperature, a temperature sensor provided in an inlet portion of the fuel filter and detecting the fuel temperature is known. When a detected temperature reaches a temperature where the high-viscosity change is canceled, it is determined that the high-viscosity change is canceled. However, since it is necessary to mount the temperature to the inlet portion of the fuel filter, a number of parts increases, and a cost increases. To monitor the increase in fuel temperature without the temperature sensor, JP-2005-273535A discloses a fuel supplying controller to set the non-detection period. Further, a count is started since a start of the internal combustion engine, and a count value is added to a timer counter in case where a vehicle speed exceeds a threshold. When the timer counter exceeds the non-detection period, it is determined that the high-viscosity change of the fuel is canceled, and then the clogging detection of the fuel filter is executed.

Generally, a temperature of the internal combustion engine is increased by a combustion of the fuel, even though the internal combustion engine operates in a steady state such as idling operation. A return fuel returned from the internal combustion engine to the fuel tank receives heat generated by combusting other fuel in the internal combustion engine, and the fuel temperature of the return fuel increases. The fuel temperature in the fuel tank is increased by the return fuel. Thus, the fuel temperature of the fuel flowing through the fuel filter may increase even in the steady state. In the fuel supplying controller, the count is executed in a case where the vehicle speed exceeds the threshold (e.g., zero) that is predetermined. In the steady state where the vehicle is not travelling, such as a case where the internal combustion engine operates in the idling operation, the vehicle speed does not exceed the threshold. In this case, the count is not executed in the steady state, and the timer counter does not exceed the non-detection period. Even when the fuel temperature increases to cancel the high-viscosity change of the fuel in the steady state, the clogging detection of the fuel filter is not started.

Further, in a case where the steady state and an unsteady state such as a travelling of the vehicle are repeated, an exceeding period for the timer counter to exceed the non-detection period since the start of the internal combustion engine may become longer because a count of the timer counter is not executed in the steady state. Therefore, when the vehicle operates in a short term, it is possible that the timer counter does not exceed the non-detection period and the clogging detection is not started.

When the clogging detection is not started, the clogging of the fuel filter generated by the foreign matters cannot be detected, the fuel is not properly supplied, and a reliability of the fuel supplying device is deteriorated.

SUMMARY

It is an object of the present disclosure to provide a fuel supplying controller which improves a reliability of a clogging detection.

According to an aspect of the present disclosure, the fuel supplying controller includes a fuel tank, a supply pump, a fuel filter, a clogging detection portion, a period setting portion, and a timer count portion. The fuel tank accommodates a fuel. The supply pump supplies the fuel from the fuel tank to an internal combustion engine of a vehicle. The fuel filter is provided in a passage between the fuel tank and the supply pump, and filters the fuel. The clogging detection portion detects a clogging of the fuel filter. The period setting portion sets a non-detection period where a clogging detection according to the clogging detection portion is prohibited. The timer count portion executes a count until a timer counter exceeds the non-detection period, after a start of the internal combustion engine. The timer count portion includes a steady count portion and an unsteady count portion. The steady count portion adds a steady count value to the timer counter in a steady state where a vehicle-state value is less than a threshold, and the unsteady count portion adds an unsteady count value that is greater than the steady count value to the timer counter in an unsteady state where the vehicle-state value is greater than or equal to the threshold.

In the steady state where the vehicle-state value is less than the threshold, the count is executed by the steady count portion. Since the count is executed by the steady count portion in the steady state such as an idling operation of the internal combustion engine, the timer counter can indicate an increase in fuel temperature according to heat transmitted to the fuel from the internal combustion engine. Therefore, even when the fuel temperature has been increased in the steady state such that the high-viscosity change of the fuel is canceled, the clogging detection of the fuel filter can be started.

In the unsteady state where the vehicle-state value is greater than or equal to the threshold, the count is executed by the unsteady count portion. In this case, the unsteady count value in the unsteady count portion is greater than the steady count value in the steady count portion. That is, the count is executed by adding the unsteady count value to the timer counter, in the unsteady state such as a travelling of the vehicle. In the unsteady state, the timer counter can indicate that an increasing rate of the fuel temperature is greater than that in the steady state. Even when the unsteady state and the steady state are repeated, an exceeding period for timer counter to exceed the non-detection period since the start of the internal combustion engine can be prevented from becoming longer.

As the above description, an accuracy of the non-detection period where the count is executed until the clogging detection is started is improved, and the reliability of the clogging detection may be improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, referring to drawings, embodiments of the present disclosure will be described. The substantially same parts or components as those in the embodiments are indicated with the same reference numerals and the same descriptions may be omitted. When only a part of a configuration in each embodiment is changed, the other parts of the configuration can be configured as the same as a prior embodiment. Further, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

(First embodiment)

Figure 1:
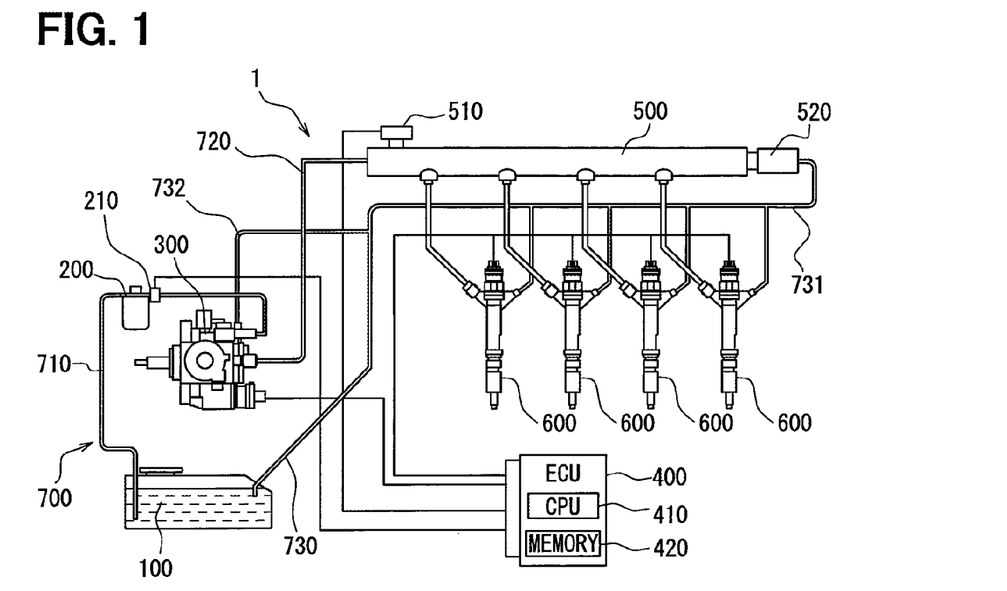
FIG. 1 is a diagram showing an outline of a fuel supplying controller according to a first embodiment of the present disclosure.

As shown in FIG. 1, a fuel supplying controller 1 according to a first embodiment of the present disclosure is used for a diesel engine, and includes a fuel tank 100, a fuel filter 200, a supply pump 300, an electric control unit (ECU) 400, a common rail 500, and injectors 600.

The fuel tank 100 corresponds to a container which accommodates fuel supplied to an internal combustion engine. The fuel tank 100 is connected to the supply pump 300 via a pipe 700 corresponding to a passage through which fuel flows. The fuel accommodated in the fuel tank 100 is drawn by the supply pump 300. Further, a main return fuel corresponding to a surplus fuel in each injector 600 and the common rail 500, and a pump return fuel corresponding to a surplus fuel in the supply pump 300, are returned to the fuel tank 100 via the pipe 700 as a return fuel.

The pipe 700 includes a low-pressure pipe 710, a high-pressure pipe 720, and a return pipe 730. The low-pressure pipe 710 corresponding to a passage is provided between the fuel tank 100 and the supply pump 300. The high-pressure pipe 720 corresponding to a passage is provided between the supply pump 300 and the common rail 500. The return pipe 730 corresponding to a passage is provided between the internal combustion engine, the supply pump 300, and the fuel tank 100. The return pipe 730 includes a main return pipe 731 and a pump return pipe 732. The main return pipe 731 corresponds to a passage through which the main return fuel is returned to the fuel tank 100. The pump return pipe 732 corresponds to a passage through which the pump return fuel is returned to the fuel tank 100. The return pipe 730 returns the main return fuel and the pump return fuel to the fuel tank 100 via the main return pipe 731 and the pump return pipe 732, respectively.

The fuel filter 200 is provided in the low-pressure pipe 710 between the fuel tank 100 and the supply pump 300. The fuel filter 200 removes foreign matter included in the fuel by filtering the fuel. The fuel filter 200 includes a clogging switch portion 210 electrically connected with the ECU 400 at an outlet portion of the fuel filter 200.

The clogging switch portion 210 includes an elastic member which deforms at a predetermined pressure, a switch member which is pressed by an elastic force of the elastic member, and a contact member which is in contact with the switch member in a case where the switch member pressed by the elastic member. When the switch member is in contact with the contact member, the clogging switch portion 210 sends an on signal to the ECU 400. When the switch member is not in contact with the contact member, the clogging switch portion 210 sends an off signal to the ECU 400. In a normal state of the clogging switch portion 210, the elastic member presses the switch member, and the switch member is in contact with the contact member. That is, the clogging switch portion 210 sends the on signal to the ECU 400 in the normal state. When a fuel pressure at the outlet portion of the fuel filter 200 becomes less than or equal to the predetermined pressure due to a clogging of the fuel filter 200, the switch member is separated from the contact member.

Specifically, since a pressure between the supply pump 300 and the fuel filter 200 becomes a negative pressure, the switch member is separated from the contact member toward the pipe 700 by the elastic member. Therefore, the clogging switch portion 210 sends the off signal to the ECU 400. That is, the clogging switch portion 210 has a structure of a normally close type. Specifically, the clogging switch portion 210 usually sends the on signal. However, when the fuel filter 200 is clogged such that the fuel pressure becomes lower, the clogging switch portion 210 sends the off signal. The ECU 400 detects the clogging of the fuel filter 200 by receiving the off signal from the clogging switch portion 210. The clogging switch portion 210 and the ECU 400 correspond to a clogging detection portion.

The injector 600 is cylindrical-shaped and is provided in a cylinder of the internal combustion engine. The injector 600 is connected to the common rail 500. The fuel is supplied from the common rail 500 to the injector 600. The injector 600 is electrically connected with the ECU 400, and injects fuel to the cylinder according to a command signal from the ECU 400. Specifically, the injector 600 includes a needle which is cylindrical-shaped and can close an injection hole formed in a distal end portion of the injector 600. When the injector 600 is attached to the cylinder, the distal end portion of the injector 600 is closer to the cylinder than a base end portion of the injector 600. The needle opens or closes the injection hole to inject the fuel to the cylinder, when moving reciprocally in an axial direction of the injector 600 after receiving the command signal from the ECU 400. The injector 600 is connected to the fuel tank 100 via the main return pipe 731. The fuel which is supplied from the common rail 500 and is not injected to the cylinder is returned to the fuel tank 100 via the main return pipe 731 as the main return fuel.

The common rail 500 is cylindrical-shaped and includes a hollow. The common rail 500 is connected to the supply pump 300 via the high-pressure pipe 720. The common rail 500 stores the fuel supplied from the supply pump 300 via the high-pressure pipe 720, and supplies the fuel to the injector 600. The common rail 500 includes a pressure sensor 510 and a pressure limiter 520. The pressure sensor 510 detects the fuel pressure in the common rail 500, and transmits a detected pressure to the ECU 400. The pressure limiter 520 is connected to the fuel tank 100 via a pipe. The pressure limiter 520 includes a valve portion provided with an elastic body. The valve portion of the pressure limiter 520 is usually closed according to a biasing force generated by an elastic force of the elastic body. When the fuel pressure in the common rail 500 becomes greater than or equal to the biasing force of the elastic body, the valve portion of the pressure limiter 520 is opened according to a deformation of the elastic body. Therefore, the common rail 500 and the fuel tank 100 are connected to each other via the main return pipe 731 which is connected to the pressure limiter 520. The pressure limiter 520 reduces the fuel pressure in the common rail 500 by discharging the fuel from the common rail 500 to the fuel tank 100, thereby preventing the fuel pressure in the common rail 500 from becoming greater than or equal to a specified pressure.

The ECU 400 includes a central processing unit (CPU) 410 which executes various calculations, and a memory 420 which stores data for calculating, calculating results, and programs. The ECU 400 is electrically connected with the injector 600, the supply pump 300, the clogging switch portion 210, and the pressure sensor 510. The ECU 400 computes a command value (command signal) of a fuel amount drawn and discharged by the supply pump 300, by executing a calculation after receiving the detected pressure from the pressure sensor 510. The ECU 400 controls the fuel amount discharged to the common rail 500 and a fuel injection pressure of the injector 600, by outputting the command value to the supply pump 300. The ECU 400 controls a fuel injection amount that is actually injected by the injector 600, by outputting a command value of the fuel injection amount to the injector 600. The ECU 400 determines that the fuel filter 200 is clogged, by receiving the off signal from the clogging switch portion 210. The memory 420 stores a map predetermined by a pre-test and indicating a relationship between a cancel period for canceling a high-viscosity change of the fuel and a fuel temperature. It is known that the viscosity of the fuel used in the internal combustion engine varies according to the fuel temperature. When the fuel temperature becomes lower, the viscosity of the fuel becomes higher. In this case, the high-viscosity change of the fuel is generated. The high-viscosity change of the fuel is a change of the viscosity of the fuel from a low viscosity to a high viscosity. The ECU 400 sets a non-detection period TL corresponding to a prohibit period where a clogging detection of the fuel filter 200 is prohibited, based on the map.

The ECU 400 executes a count by adding a count value A to a timer counter Tc which is sequentially stored in the memory 420, after a start of the internal combustion engine. The count value A may be a steady count value Ab or an unsteady count value Ac. The count is executed based on a vehicle-state value that is predetermined. The vehicle-state value is a value indicating a vehicle state. Specifically, when the vehicle-state value is less than a threshold, the ECU 400 determines that the internal combustion engine operates in a steady state, and executes the count by adding the steady count value Ab to the timer counter Tc. When the vehicle-state value is greater than or equal to the threshold, the ECU 400 determines that the internal combustion engine operates in an unsteady state, and executes the count by adding the unsteady count value Ac to the timer counter Tc. In this case, the unsteady count value Ac corresponds to the steady count value Ab after being corrected. The ECU 400 corresponds to a timer count portion.

Figure 2:
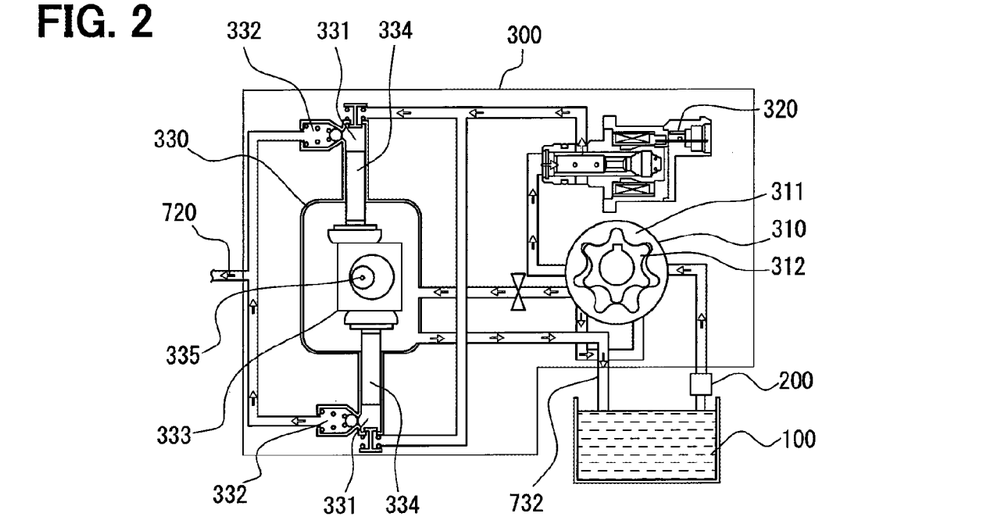
FIG. 2 is a diagram showing an operation of a supply pump according to the first embodiment.

The supply pump 300 supplies the fuel to the internal combustion engine, by drawing the fuel from the fuel tank 100 and discharging the fuel to the common rail 500. As shown in FIG. 2, the supply pump 300 includes a feed pump 310, a fuel regulator 320, and a high-pressure pump 330. The feed pump 310 corresponding to a low-pressure pump may be a trochoid pump. Since a space formed by both an outer roller 311 and an inner roller 312 is changed according to a rotation of a rotor, the fuel is drawn from the fuel tank 100 and is supplied to the high-pressure pump 330. The fuel regulator 320 is provided in a passage between the feed pump 310 and the high-pressure pump 330. The fuel regulator 320 is an electronic valve connected to the ECU 400. The fuel regulator 320 controls an amount of the fuel supplied to the high-pressure pump 330 by receiving a command from the ECU 400. Since the fuel regulator 320 controls the amount of the fuel compressed in the high-pressure pump 330, a pressure of the fuel supplied from the high-pressure pump 330 to the common rail 500 can be controlled. The high-pressure pump 330 includes a pump chamber 331 in which the fuel is compressed, a check valve 332 provided at an outlet portion of the pump chamber 331, a cam ring 333 including a space for a cam shaft 335 to rotate, and a plunger 334 receiving a power from the cam ring 333 to move reciprocally. The fuel supplied to the pump chamber 331 is compressed to a high-pressure fuel according to a reciprocal movement of the plunger 334 in the pump chamber 331. The fuel that is compressed is discharged to the common rail 500 via the check valve 332. The check valve 332 is a mechanical valve member provided to prevent the fuel discharged to the common rail 500 from flowing backward to the high-pressure pump 330.

A part of the fuel supplied to the feed pump 310 is supplied to the plunger 334 and the cam ring 333 as a lubricant of the high-pressure pump 330. The fuel used as the lubricant is returned to the fuel tank 100 via the pump return pipe 732 after lubricating the plunger 334 or the cam ring 333.

Figure 3:
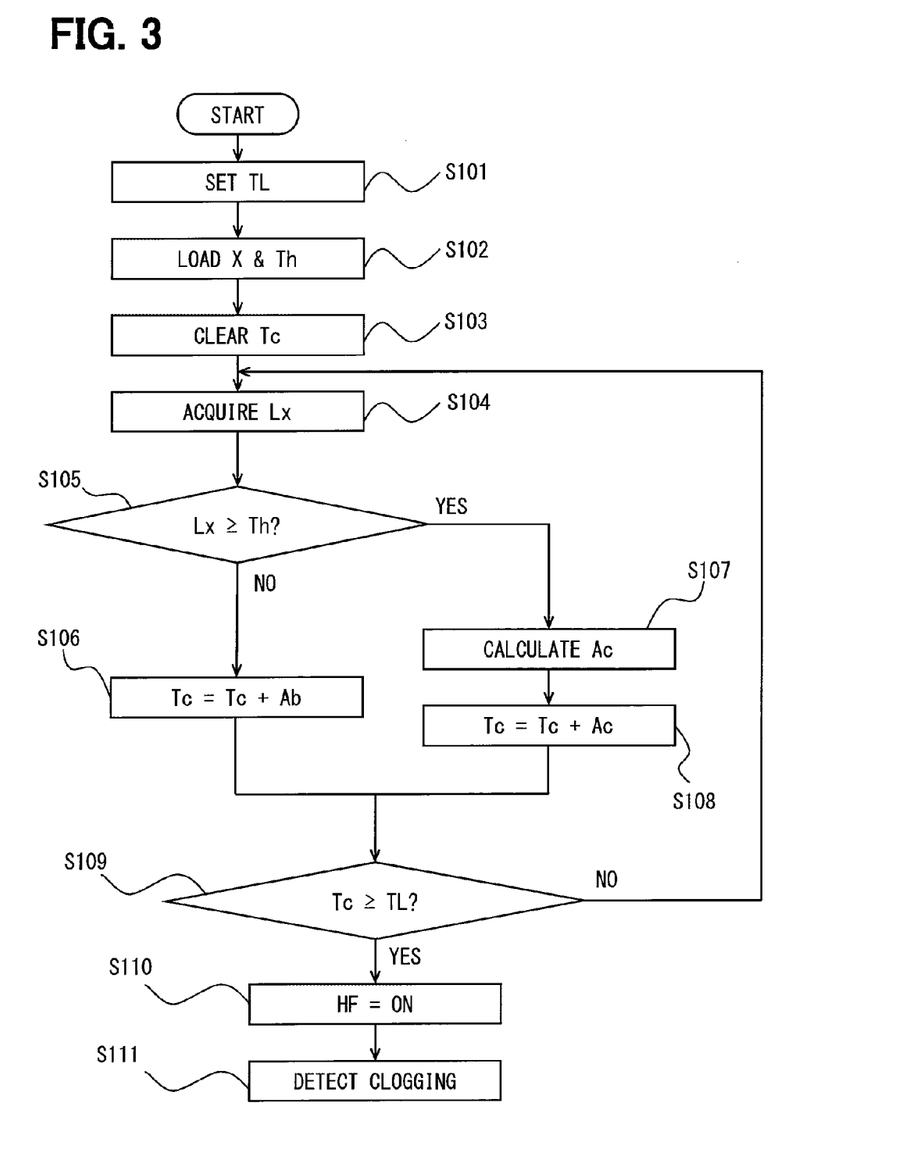
FIG. 3 is a flowchart showing a counting flow according to the first embodiment.

Next, as shown in FIG. 3, a flowchart indicating a flow of executing the count according to the present embodiment will be described. According to the present embodiment, a fuel return amount Lx is used as the vehicle-state value. According to the present embodiment, the return fuel is a surplus fuel returned to the fuel tank 100 from the internal combustion engine and the supply pump 300. Specifically, the return fuel corresponds to the fuel returned to the fuel tank 100 from the common rail 500, the injector 600, and the supply pump 300.

The ECU 400 executes the present flow. The present flow is started in a case where a warm-up complete flag HF is set to off after the start of the internal combustion engine. The warm-up complete flag HF is set for determining whether the high-viscosity change of the fuel is canceled. For example, when the warm-up complete flag HF is set to on, the high-viscosity change of the fuel is canceled. In addition, when the internal combustion engine is stopped, the warm-up complete flag HF is set to off.

At S101, the ECU 400 sets the non-detection period TL. The ECU 400 sets the non-detection period TL based on the map stored in the memory 420. The map indicates a relationship between the cancel period for in the steady state and the fuel temperature of the fuel before flowing through the fuel filter 200. The map is stored in the memory 420 after the pre-test. The relationship between time and the fuel temperature may be a relationship between the cancel period and the fuel temperature which is indirectly calculated based on an outer temperature of the vehicle. Alternatively, the relationship may be a relationship between a physical property of the fuel such as viscosity and a change period for the physical property changing to a value that the high-viscosity change of the fuel is canceled. The ECU 400 calculates the cancel period based on the map and the fuel temperature of the fuel flowing through the fuel filter 200. Further, the ECU 400 sets the non-detection period TL corresponding to the cancel period. That is, the non-detection period TL is set to the cancel period in the steady state. Then, the ECU 400 proceeds to S102. In addition, according to the present embodiment, an operation of S101 corresponding to a period setting portion.

At S102, the ECU 400 loads the threshold Th and a correction coefficient X. Specifically, the threshold Th and the correction coefficient X are calculated by a test of a fuel temperature change according to the fuel return amount Lx returned to the fuel tank 100, and are stored in the memory 420. Then, the ECU 400 loads the threshold Th and the correction coefficient X from the memory 420. The threshold Th for determining the steady state or the unsteady state, and the correction coefficient X used for acquiring the unsteady count value Ac by multiplying the steady count value Ab by the correction coefficient X, relate to the fuel return amount Lx corresponding to the vehicle-state value. The steady count value Ab is a constant value that is predetermined such as an integer value. The steady count value Ab is a standard value of the count value A added to the timer counter Tc. The correction coefficient X is set to a value greater than 1, such that the unsteady count value Ac is greater than the steady count value Ab. The unsteady count value Ac is acquired by multiplying the steady count value Ab by the correction coefficient X. Then, the ECU 400 proceeds to S103.

At S103, the ECU 400 clears the timer counter Tc added by the count value A. At S104, the ECU 400 acquires the fuel return amount Lx. The fuel return amount Lx may be the injection amount subtracted from the fuel amount. In this case, the injection amount is an amount of the fuel injected by the injector 600 to the cylinder, and the fuel amount is an amount of the fuel supplied from the supply pump 300 to the internal combustion engine. Alternatively, the fuel return amount Lx may be directly detected by a detector provided in the return pipe 730.

At S105, the ECU 400 determines whether the fuel return amount Lx acquired at S104 is greater than or equal to the threshold Th loaded at S102. When the ECU 400 determines that the fuel return amount Lx is less than the threshold Th, the ECU 400 determines the internal combustion engine operates in the steady state, and proceeds to S106. At S106, the ECU 400 adds the steady count value Ab to the timer counter Tc. Since the timer counter Tc is added by the steady count value Ab in the steady state where the fuel return amount Lx is less than the threshold Th, an operation of S106 corresponds to a steady count portion.

When the ECU 400 determines that the fuel return amount Lx is greater than or equal to the threshold Th at S105, the ECU 400 determines that the internal combustion engine operates in the unsteady state, and proceeds to S107. At S107, the ECU 400 calculates the unsteady count value Ac by multiplying the steady count value Ab by the correction coefficient X. Since the correction coefficient X is set to a value greater than 1, the unsteady count value Ac is greater than the unsteady count value Ab. Then, the ECU 400 proceeds to S108.

At S108, the ECU 400 adds the unsteady count value Ac calculated at S107 to the timer counter Tc. Since the timer counter Tc is added by the unsteady count value Ac in the unsteady state where the fuel return amount Lx is greater than or equal to the threshold Th, an operation of S108 corresponds to an unsteady count portion.

The ECU 400 proceeds to S109, after adding the steady count value Ab or the unsteady count value Ac to the timer counter Tc. At S109, the ECU 400 compares the timer counter Tc to the non-detection period TL, and determines whether the timer counter Tc is greater than or equal to the non-detection period TL. When the ECU 400 determines that the timer counter Tc is less than the non-detection period TL, the ECU 400 returns to S104. When the ECU 400 determines that the timer counter Tc is greater than or equal to the non-detection period TL, the ECU 400 proceeds to S110. At S110, the ECU 400 turns on the warm-up complete flag HF (sets the warm-up complete flag HF to on), and proceeds to S111.

At S111, the ECU 400 detects the clogging of the fuel filter 200 by the clogging switch portion 210 provided in the fuel filter 200. When the fuel filter 200 is clogged, the clogging switch portion 210 provided at the outlet portion of the fuel filter 200 operates according to a decrease in fuel pressure between the supply pump 300 and the fuel filter 200, and sends the off signal to the ECU 400. At S111, when the ECU 400 determines that the off signal continues for a specified period, the ECU 400 turns on a temporary determination switch TSW. Further, when the ECU 400 determines that the temporary determination switch TSW continues to be turned on for a specified period, the ECU 400 determines that the fuel filter 200 is clogged.

In addition, a time period for executing S104, S105, S106 and S109 is the same as a time period for executing S104, S105, S107, S108 and S109.

Figure 4:
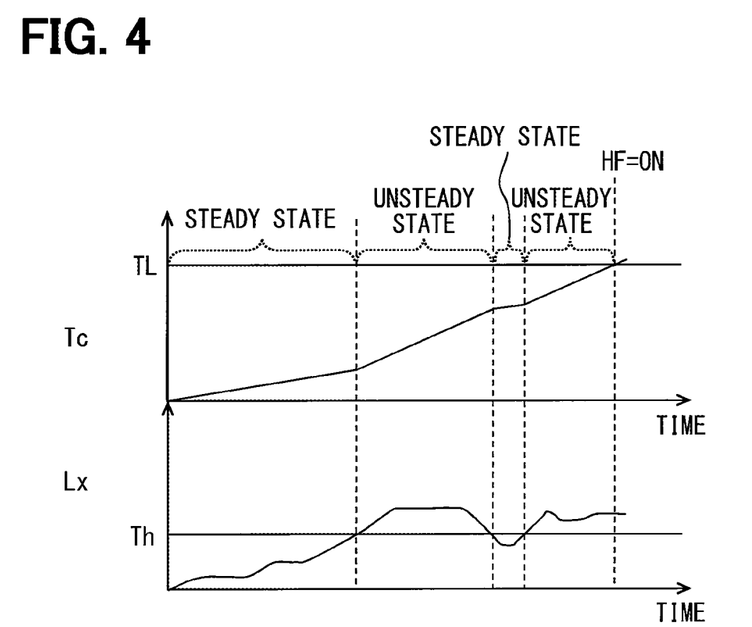
FIG. 4 is a graph showing a relationship between a timer counter, a vehicle-state value, and time, according to the first embodiment.

As the above description, the timer counter Tc is added until the timer counter Tc exceeds the non-detection period TL as shown in FIG. 4. In the steady state where the fuel return amount Lx is less than the threshold Th, the count is executed by adding the steady count value Ab to the timer counter Tc. In the unsteady state where the fuel return amount Lx is greater than or equal to the threshold Th, the count is executed by adding the unsteady count value Ac to the timer counter Tc. When the timer counter Tc exceeds the non-detection period TL, the ECU 400 determines that the high-viscosity change of the fuel is canceled. When the ECU 400 turns on the warm-up complete flag HF, the clogging detection is executed.

According to the first embodiment, when the vehicle-state value is in the steady state where the vehicle-state value is less than the threshold Th, the count is executed by S106 corresponding to the steady count portion. Since the count is executed by S106 in the steady state such as an idling operation of the internal combustion engine, the timer counter Tc can indicate an increase in fuel temperature according to heat transmitted to the fuel from the internal combustion engine. Therefore, even when the fuel temperature has been increased in the steady state such that the high-viscosity change of the fuel is canceled, the clogging detection of the fuel filter 200 can be started.

According to the first embodiment, when the vehicle-state value is in the unsteady state where the vehicle-state value is greater than or equal to the threshold Th, the count is executed by S108 corresponding to the unsteady count portion. In this case, the unsteady count value Ac is greater than the steady count value Ab. That is, the count is executed by adding the unsteady count value Ac to the timer counter Tc, in the unsteady state such as a travelling of the vehicle. In the unsteady state, the timer counter Tc can indicate that an increasing rate of the fuel temperature is greater than that in the steady state. Even when the unsteady state and the steady state are repeated, an exceeding period for timer counter Tc to exceed the non-detection period TL since the start of the internal combustion engine can be prevented from becoming longer.

As the above description, an accuracy of the non-detection period TL where the count is executed until the clogging detection is started is improved, and a reliability of the clogging detection may be improved.

According to the first embodiment, the fuel return amount Lx corresponding to the fuel amount returned to the fuel tank 100 from the internal combustion engine is used as the vehicle-state value, and the steady state is determined in a case where the fuel return amount Lx is less than the threshold Th. Since the return fuel returned to the fuel tank 100 from the internal combustion engine is increased according to the heat transmitted to the return fuel from the internal combustion engine, the fuel temperature in the fuel tank 100 is readily increased. Since the count is executed based on the fuel return amount Lx and the threshold Th, the timer counter Tc can accurately indicate an actual increase of the fuel temperature. Therefore, the reliability of the clogging detection according to the accuracy of the non-detection period TL can be improved.

(Second embodiment)

Figure 5:
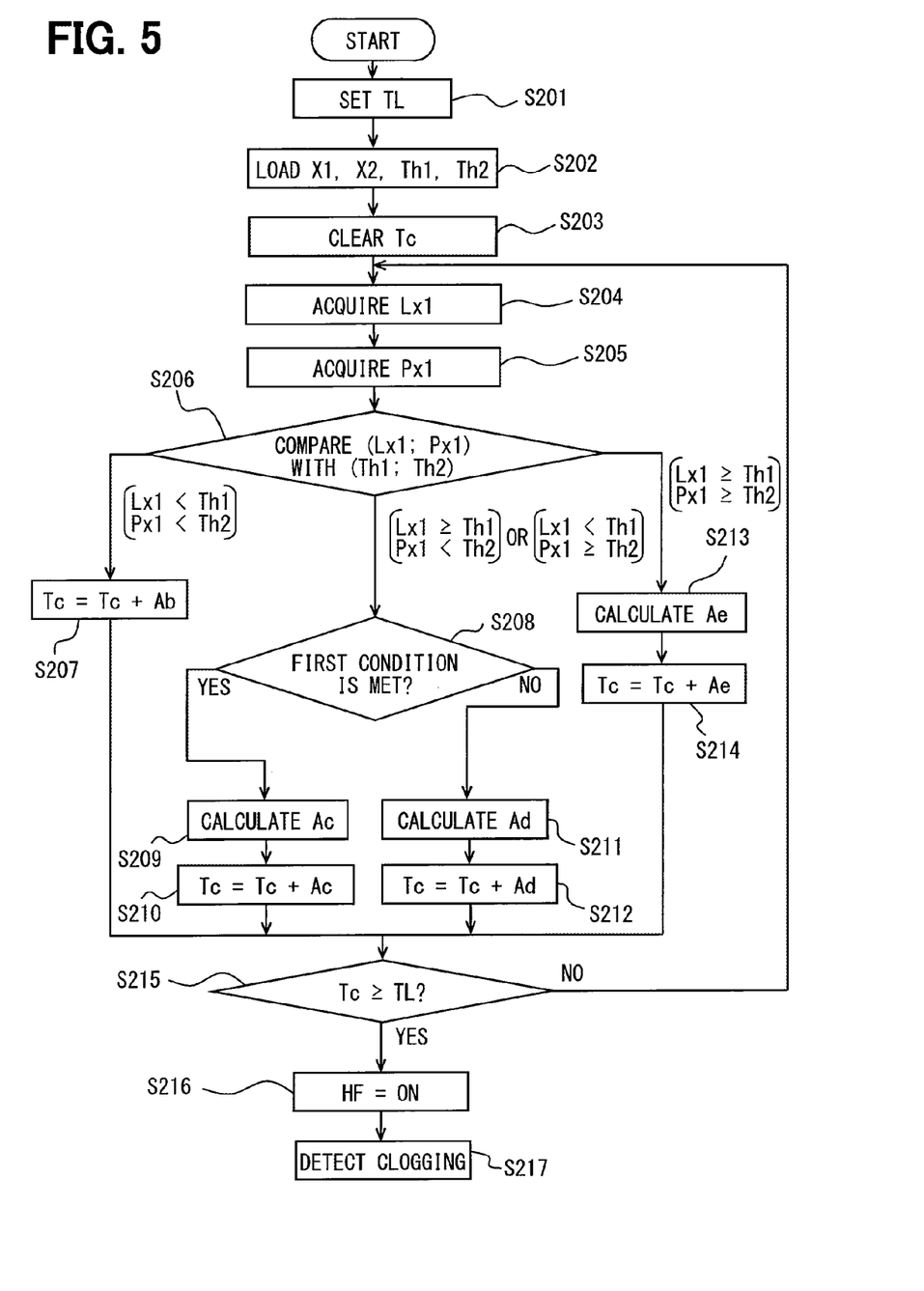
FIG. 5 is a flowchart showing a counting flow according to a second embodiment of the present disclosure.
Figure 6:
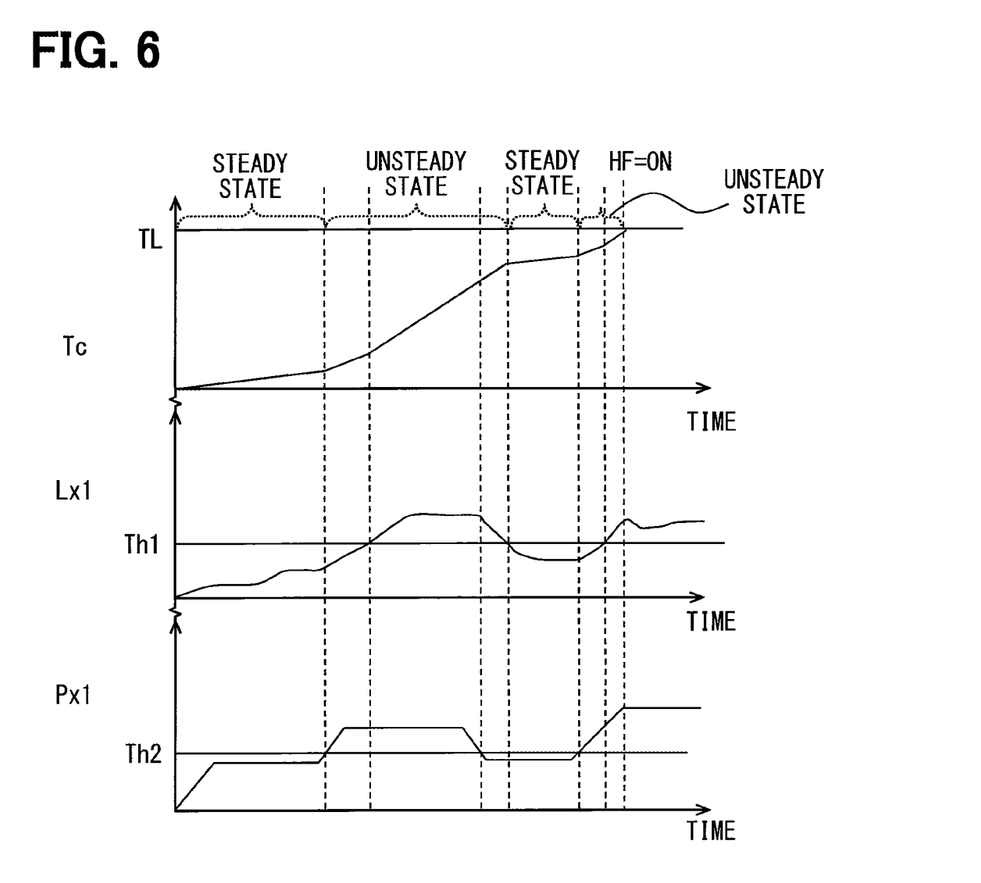
FIG. 6 is a graph showing a relationship between a timer counter, vehicle-state values, and time, according to the second embodiment.

As shown in FIGS. 5 and 6, a second embodiment of the present disclosure will be described.

According to the present embodiment, the flow of executing the count is different from that in the first embodiment. Specifically, the ECU 400 executes the count by determining the steady state or the unsteady state based on a plurality of vehicle-state values. That is, the ECU 400 determines the steady state in a case where each vehicle-state value is less than a threshold that is set according to the vehicle-state value. The ECU 400 determines the unsteady state in a case where at least one of the vehicle-state values is greater than or equal to a corresponding threshold. In addition, according to the present embodiment, two vehicle-state values are used as the vehicle-state values mentioned above. Specifically, a fuel return amount Lx1 and an injection pressure Px1 are used as the two vehicle-state values. The injection pressure Px1 is a fuel pressure of the fuel injected by the injector 600 to each cylinder of the internal combustion engine.

As shown in FIG. 5, the flow of executing the count according to the present embodiment will be described. The ECU 400 executes the present flow. The present flow is started in a case where the warm-up complete flag HF is set to off after the start of the internal combustion engine.

At S201, the ECU 400 sets the non-detection period TL. The ECU 400 sets the non-detection period TL based on the map stored in the memory 420. The non-detection period TL is set to the cancel period in a case where the internal combustion engine operates in the steady state. Then, the ECU 400 proceeds to S202. In addition, according to the present embodiment, an operation of S201 corresponds to the period setting portion.

At S202, the ECU 400 loads a threshold Th1, a correction coefficient X1, a threshold Th2, and a correction coefficient X2. Specifically, the threshold Th1 and the correction coefficient X1 are calculated by a test of a fuel temperature change according to the fuel return amount Lx1 returned to the fuel tank 100, and are stored in the memory 420. Then, the ECU 400 loads the threshold Th1 and the correction coefficient X1 from the memory 420. The correction coefficient X1 is used for acquiring the unsteady count value Ac by multiplying the steady count value Ab by the correction coefficient X1, according to the fuel return amount Lx1. The threshold Th1 and the correction coefficient X1 correspond to the fuel return amount Lx1 which is a first part of the vehicle-state values. Further, the threshold Th2 and the correction coefficient X2 are calculated by a test of a fuel temperature change relative to the fuel injection pressure of the injector 600, and are stored in the memory 420. Then, the ECU 400 loads the threshold Th2 and the correction coefficient X2 from the memory 420. The correction coefficient X2 is used for acquiring an unsteady count value Ad by multiplying the steady count value Ab by the correction coefficient X2, according to the injection pressure Px1. The threshold Th2 and the correction coefficient X2 correspond to the injection pressure Px1 which is a second part of the vehicle-state values.

The correction coefficient X1 is set to a value greater than 1, such that the unsteady count value Ac is greater than the steady count value Ab. The correction coefficient X2 is set to a value greater than 1, such that the unsteady count value Ad is greater than the steady count value Ab. Further, the correction coefficient X1 and the correction coefficient X2 are set to be different from each other, such that the unsteady count value Ac is different from the unsteady count value Ad. According to the present embodiment, the correction coefficient X1 corresponding to the fuel return amount Lx1 is set to a value greater than the correction coefficient X2 corresponding to the injection pressure Px1. Then, the ECU 400 proceeds to S203.

At S203, the ECU 400 clears the timer counter Tc. At S204, the ECU 400 acquires the fuel return amount Lx1. At S205, the ECU 400 acquires the injection pressure Px1. The injection pressure Px1 may be calculated based on the fuel pressure in the common rail 500 detected by the pressure sensor 510 provided in the common rail 500. Alternatively, the injection pressure Px1 may be directly detected by a pressure detector provided in the injector 600.

At S206, the ECU 400 determines whether a first condition that the fuel return amount Lx1 is greater than or equal to the threshold Th1 or a second condition that the injection pressure Px1 is greater than or equal to the threshold Th2 is met. When the ECU 400 determines that the first condition and the second condition are not met, the ECU 400 proceeds to S207. At S207, the ECU 400 adds the steady count value Ab to the timer counter Tc.

When the ECU 400 determines that one of the first condition and the second condition is met at S206, the ECU 400 proceeds to S208. At S208, the ECU 400 determines whether the first condition is met. When the ECU 400 determines that the first condition is met, the ECU 400 proceeds to S209. At S209, the ECU 400 calculates the unsteady count value Ac with respect to the fuel return amount Lx1. Specifically, the ECU 400 calculates the unsteady count value Ac by multiplying the steady count value Ab by the correction coefficient X1. At S210, the ECU 400 adds the unsteady count value Ac to the timer counter Tc. When the ECU 400 determines that the second condition is met at S208, the ECU 400 proceeds to S211. At S211, the ECU 400 calculates the unsteady count value Ad with respect to the injection pressure Px1. Specifically, the ECU 400 calculates the unsteady count value Ad by multiplying the steady count value Ab by the correction coefficient X2. At S212, the ECU 400 adds the unsteady count value Ad to the timer counter Tc.

When the ECU 400 determines that both the first condition and the second condition are met as S206, the ECU 400 proceeds to S213. At S213, the ECU 400 calculates an unsteady count value Ae. Specifically, the ECU 400 calculates the unsteady count value Ac and the unsteady count value Ad, respectively. The ECU 400 calculates the unsteady count value Ae by a sum of the unsteady count value Ac and the unsteady count value Ad. That is, the unsteady count value Ae is a sum of the unsteady count value Ac and the unsteady count value Ad. Then, the ECU 400 proceeds to S214. At S214, the ECU 400 adds the unsteady count value Ae to the timer counter Tc.

The correction coefficients X1, X2 are set to values greater than 1, and the correction coefficient X1 is greater than the correction coefficient X2. Therefore, the unsteady count values Ac, Ad are greater than the steady count value Ab, and the unsteady count value Ac is greater than the unsteady count value Ad.

In the steady state where the first condition and the second condition are not met, since the ECU 400 adds the steady count value Ab to the timer counter Tc at S207, an operation of S207 corresponds to the steady count portion. In the unsteady state where one of the first condition and the second condition is met, since the ECU 400 adds the unsteady count value Ac or the unsteady count value Ad to the timer counter Tc at S210 or S212, respectively, operations of S210 and S212 correspond to the unsteady count portion. In the unsteady state where both the first condition and the second condition are met, since the ECU 400 adds the unsteady count value Ae to the timer counter Tc at S214, an operation of S214 corresponds to the unsteady count portion.

Then, the ECU 400 proceeds to S215 after S207, S210, S212, and S214. At S215, the ECU 400 compares the timer counter Tc to the non-detection period TL, and determines whether the timer counter Tc is greater than or equal to the non-detection period TL. When the ECU 400 determines that the timer counter Tc is less than the non-detection period TL, the ECU 400 returns to S204. When the ECU 400 determines that the timer counter Tc is greater than or equal to the non-detection period TL, the ECU 400 proceeds to S216. At S216, the ECU 400 turns on the warm-up complete flag HF, and proceeds to S217. At S217, the ECU 400 executes the clogging detection as the same as that in the first embodiment.

In addition, a time period for executing S204, S205, S206, S207 and S215, a time period for executing S204, S205, S206, S208, S209, S210 and S215, a time period for executing S204, S205, S206, S208, S211, S212 and S215, and a time period for executing S204, S205, S206, S213, S214 and S215 are the same.

According to the above description, as shown in FIG. 6, the timer counter Tc is added by the steady count value Ab, the unsteady count value Ac, Ad or Ae, until the timer counter Tc exceeds the non-detection period TL. When the ECU 400 determines that the first condition and the second condition are not met, the ECU 400 determines the steady state, and executes the count by adding the steady count value Ab to the timer counter Tc. When the ECU 400 determines that the first condition is met and the second condition is not met, the ECU 400 determines the unsteady state, and executes the count by adding the unsteady count value Ac corresponding to the fuel return amount Lx1 to the timer counter Tc. When the ECU 400 determines that the first condition is not met and the second condition is met, the ECU 400 determines the unsteady state, and executes the count by adding the unsteady count value Ad corresponding to the injection pressure Px1 to the timer counter Tc. When the ECU 400 determines that both the first condition and the second condition are met, the ECU 400 determines the unsteady state, and executes the count by adding the unsteady count value Ae corresponding to a sum of the unsteady count value Ac and the unsteady count value Ad to the timer counter Tc. Further, when the ECU 400 determines that the timer counter Tc exceeds the non-detection period TL, the ECU 400 determines that the high-viscosity change of the fuel is canceled, and turns on the warm-up complete flag HF and executes the clogging detection as the same as that in the first embodiment.

According to the second embodiment, the fuel return amount Lx1 is used as the first part of the vehicle-state values, and the injection pressure Px1 is used as the second part of the vehicle-state values. The fuel return amount Lx1 is as the same as the fuel return amount Lx in the first embodiment. The injection pressure Px1 corresponds to the fuel pressure of the fuel injected to the internal combustion engine. The injection pressure Px1 is a vehicle-state value determining an output for driving the internal combustion engine. When the injection pressure Px1 is changed, a combustion state of the internal combustion engine is changed. Since the fuel temperature is increased according to the heat transmitted to the fuel from the internal combustion engine, the timer counter Tc can indicate an increase in fuel temperature according to a combustion of the fuel.

Therefore, the reliability of the clogging detection according to the accuracy of the non-detection period TL can be improved.

According to the second embodiment, in the unsteady state where at least one of the vehicle-state values is greater than or equal to the corresponding threshold, one of the unsteady count value Ac, Ad and Ae is added to the timer counter Tc. Therefore, the timer counter Tc can indicate the unsteady state where the increasing rate of the fuel temperature becomes greater. According the second embodiment, in the steady state where all of the vehicle-state values are less than the thresholds, respectively, the steady count value Ab is added to the timer counter Tc. Therefore, the timer counter Tc can indicate the steady state where the increasing rate of the fuel temperature becomes smaller. According to the second embodiment, since the increasing rate of the fuel temperature is accurately changed according to the vehicle-state values, a count speed can be accurately changed. Therefore, the reliability of the clogging detection according to the accuracy of the non-detection period TL can be improved.

According to the second embodiment, the unsteady count value Ac, Ad or Ae corresponding to different vehicle-state values is added to the timer counter Tc. Further, the unsteady count values Ac, Ad and Ae are different from each other. Considering an effect level of each vehicle-state value relative to an increase of the fuel temperature such as the increasing rate of the fuel temperature, the count can be executed according to each vehicle-state value by changing a relative weight of the unsteady count value Ac, Ad or Ae. Therefore, the reliability of the clogging detection according to the accuracy of the non-detection period TL can be improved.

(Other embodiment)

The present disclosure is not limited to the embodiments mentioned above, and can be applied to various embodiments within the spirit and scope of the present disclosure.

According to a first modification of the present disclosure, the ECU 400 may execute the clogging detection in a case where a differential pressure between an inlet portion of the fuel filter 200 and the outlet portion of the fuel filter 200 varies from a predetermined pressure.

According to a second modification of the present disclosure, the vehicle-state value used for determining the steady state or the unsteady state may be an engine speed or an accelerator position. Further, the vehicle-state value relative to an increase of the fuel temperature of the fuel flowing through the fuel filter 200 may be determined by test.

According to a third modification of the present disclosure, a step calculating the unsteady count value Ac, Ad or Ae may be executed before S105 in which the ECU 400 determines whether the vehicle-state value exceeds the threshold Th in the first embodiment, or before S206 in which the ECU 400 determines whether the first condition or the second condition is met in the second embodiment.

According to a fourth modification of the present disclosure, the steady count value Ab may be calculated by correcting the unsteady count value Ac that is used as a standard value. In this case, the steady count value Ab is calculated by multiplying the unsteady count value Ac by the correction coefficient X. Since the correction coefficient X is set to a value less than 1, the unsteady count value Ac is greater than the steady count value Ab.

According to a fifth modification of the present disclosure, the steady count Ab and one of the unsteady count values Ac and Ad may be calculated by correcting the other one of the unsteady count values Ac and Ad which is used as the standard value.

According to a sixth modification of the present disclosure, at least two of the unsteady count values Ac, Ad and Ae are set to the same value.

According to a seventh modification of the present disclosure, the ECU 400 may determine the unsteady state in a case where all of the vehicle-state values are greater than or equal to the thresholds, respectively, and the ECU 400 may determine the steady state in a case where at least one of the vehicle-state values is less than the corresponding threshold.

According to an eighth modification of the present disclosure, three or more vehicle-state values may be predetermined. The count may be executed in the unsteady state where at least one of the vehicle-state values is greater than or equal to the corresponding threshold, or may be executed in the steady state where all of the vehicle-state values are less than the thresholds, respectively.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A fuel supplying controller comprising:
    a fuel tank accommodating a fuel;
    a supply pump supplying the fuel from the fuel tank to an internal combustion engine of a vehicle;
    a fuel filter provided in a passage between the fuel tank and the supply pump, the fuel filter filtering the fuel;
    a clogging detection portion detecting a clogging of the fuel filter;
    a period setting portion setting a non-detection period where a clogging detection according to the clogging detection portion is prohibited;
    a comparison portion comparing a vehicle-state value with a threshold; and
    a timer count portion executing a count until a timer counter exceeds the nondetection period, after a start of the internal combustion engine, wherein the timer count portion includes
        a steady count portion adding a steady count value to the timer counter in a steady state where a vehicle-state value is less than the threshold, and
        an unsteady count portion adding an unsteady count value that is greater than the steady count value to the timer counter in an unsteady state where the vehicle-state value is greater than or equal to the threshold, and
    the vehicle-state value is a value indicating a vehicle state and is a fuel return amount corresponding to a fuel amount returned to the fuel tank from the internal combustion engine, and
    the steady state includes a state that the fuel return amount is less than the threshold.

2. The fuel supplying controller according to claim 1, wherein
    the comparison portion compares another vehicle-state value with another threshold;
    the another vehicle-state value is an injection pressure corresponding to a fuel pressure of the fuel injected to the internal combustion engine, and the steady state includes a state that the injection pressure is less than the another threshold.

3. A fuel supplying controller comprising:
a fuel tank accommodating a fuel;
a supply pump supplying the fuel from the fuel tank to an internal combustion engine of a vehicle;
a fuel filter provided in a passage between the fuel tank and the supply pump, the fuel filter filtering the fuel;
a clogging detection portion detecting a clogging of the fuel filter;
a period setting portion setting a non-detection period where a clogging detection according to the clogging detection portion is prohibited; and
a timer count portion executing a count until a timer counter exceeds the non-detection period, after a start of the internal combustion engine,
a comparison portion comparing vehicle-state values with corresponding thresholds, respectively; wherein
the timer count portion includes
    an unsteady count portion adding an unsteady count value to the timer counter in an unsteady state where at least one of the vehicle-state values is greater than or equal to the corresponding threshold, and
    a steady count portion adding a steady count value to the timer counter in a steady state where all of the vehicle-state values are less than the corresponding thresholds, respectively,
the unsteady count value is greater than the steady count value,
the vehicle-state value is a value indicating a vehicle state;
the vehicle-state values include a fuel return amount corresponding to a fuel amount returned to the fuel tank from the internal combustion engine, and
the steady state includes a state that the fuel return amount is less than the threshold.

4. The fuel supplying controller according to claim 3, wherein the unsteady count portion adds the unsteady count value according to the vehicle-state values to the timer counter.

5. The fuel supplying controller according to claim 3, wherein
the vehicle-state values further include an injection pressure corresponding to a fuel pressure of the fuel injected to the internal combustion engine, and
the steady state includes a state that the injection pressure is less than the threshold.

* * * * *